(12) United States Patent
Kishikawa

(10) Patent No.: US 10,557,747 B2
(45) Date of Patent: Feb. 11, 2020

(54) COMBINATION WEIGHING DEVICE

(71) Applicant: Ishida Co., Ltd., Kyoto (JP)

(72) Inventor: Mikio Kishikawa, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 288 days.

(21) Appl. No.: 15/548,603

(22) PCT Filed: Dec. 21, 2015

(86) PCT No.: PCT/JP2015/085684
§ 371 (c)(1),
(2) Date: Aug. 3, 2017

(87) PCT Pub. No.: WO2016/125407
PCT Pub. Date: Aug. 11, 2016

(65) Prior Publication Data
US 2018/0010955 A1      Jan. 11, 2018

(30) Foreign Application Priority Data

Feb. 4, 2015   (JP) .................................. 2015-020073

(51) Int. Cl.
*G01G 19/393*      (2006.01)
*G01G 13/24*       (2006.01)
(Continued)

(52) U.S. Cl.
CPC .......... *G01G 19/393* (2013.01); *G01G 13/24* (2013.01); *B65D 88/26* (2013.01); *B65D 90/20* (2013.01); *B65G 65/32* (2013.01)

(58) Field of Classification Search
CPC ........ B65D 88/26; B65D 90/20; B65G 65/32; G01G 13/24; G01G 19/393
See application file for complete search history.

(56) References Cited

U.S. PATENT DOCUMENTS 4,499,962 A * 2/1985 Izumi .................. G01G 13/024
                                                   177/128
4,549,619 A * 10/1985 Fujiwara .............. G01G 19/393
                                                   177/112
(Continued)

FOREIGN PATENT DOCUMENTS

CN      101576398 A      11/2009
CN      101641578 A       2/2010
(Continued)

OTHER PUBLICATIONS

JP2009092399 English Translation (Year: 2009).*
(Continued)

*Primary Examiner* — Natalie Huls
(74) *Attorney, Agent, or Firm* — Studebaker & Brackett PC

(57) ABSTRACT

A combination weighing apparatus includes a timing hopper, a frame, and a support member. The support member is a member attached to the frame and moves a position of the timing hopper between (1) a first mounting position at which the timing hopper receives and retains objects to be weighed and (2) a second mounting position related to attachment and detachment of the timing hopper without changing a fixed state of the timing hopper with respect to the support member. A movement direction in which the timing hopper moves from the first mounting position to the second mounting position intersects a removing direction in which the timing hopper fixed at the predetermined position is removed from the support member.

4 Claims, 6 Drawing Sheets

(51) Int. Cl.
  *B65D 88/26* (2006.01)
  *B65D 90/20* (2006.01)
  *B65G 65/32* (2006.01)

(56) References Cited

U.S. PATENT DOCUMENTS

| | | | | |
|---|---|---|---|---|
| 4,874,048 | A * | 10/1989 | Kawanishi | G01G 13/024 |
| | | | | 177/25.18 |
| 6,373,001 | B1 * | 4/2002 | Kono | G01G 15/00 |
| | | | | 177/25.18 |
| 9,228,883 | B2 * | 1/2016 | Nagai | G01G 19/393 |
| 9,267,838 | B2 * | 2/2016 | Takayanagi | G01G 19/393 |
| 2002/0157875 | A1 * | 10/2002 | Tanaka | G01G 13/18 |
| | | | | 177/25.18 |
| 2005/0087372 | A1 * | 4/2005 | Asai | G01G 13/16 |
| | | | | 177/25.18 |
| 2005/0205308 | A1 | 9/2005 | Brix | |
| 2010/0108404 | A1 | 5/2010 | Kieselhorst | |
| 2013/0283943 | A1 * | 10/2013 | Nagai | G01G 19/393 |
| | | | | 74/89 |
| 2017/0023399 | A1 * | 1/2017 | Morimoto | G01G 13/024 |
| 2017/0299423 | A1 * | 10/2017 | Horitani | G01G 19/393 |

FOREIGN PATENT DOCUMENTS

| | | |
|---|---|---|
| CN | 102007388 A | 4/2011 |
| CN | 104303029 A | 1/2015 |
| EP | 0 076 093 A1 | 4/1983 |
| JP | S62-140418 U | 9/1987 |
| JP | H05-014182 Y2 | 4/1993 |
| JP | 2008-026250 A | 2/2008 |
| JP | 2009-092399 A | 4/2009 |
| JP | 2009092399 * 4/2009 | ........... G01G 19/387 |
| JP | 2010-281745 A | 12/2010 |

OTHER PUBLICATIONS

An Office Action issued by the Japanese Patent Office dated Mar. 6, 2018, which corresponds to Japanese Patent Application No. 2016-573206 and is related to U.S. Appl. No. 15/548,603; with English translation.

International Search Report issued in PCT/JP2015/085684; dated Mar. 15, 2016.

An Office Action issued by the Chinese Patent Office dated Mar. 1, 2019, which corresponds to Chinese Patent Application No. 201580075302.8 and is related to U.S. Appl. No. 15/548,603; with English translation.

Notification of Transmittal of Translation of the International Preliminary Report on Patentability (Chapter I) and Translation of Written Opinion of the International Searching Authority; PCT/JP2015/085684; dated Aug. 17, 2017.

The extended European search report issued by the European Patent Office dated Aug. 3, 2018, which corresponds to EP15881224.8-1001 and is related to U.S. Appl. No. 15/548,603.

* cited by examiner

COMBINATION WEIGHING DEVICE

TECHNICAL FIELD

The present disclosure relates to a combination weighing apparatus.

BACKGROUND ART

Patent Literature 1 discloses a combination weighing apparatus including a discharge hopper. This combination weighing apparatus includes square bar-shaped rails 6 and 7 on a lower side of a base 1. Further, the rails 6 and 7 support a frame 10 which has a rectangular hole 10a corresponding to a discharge port of a collecting chute 2. A discharge hopper 13 is attached to the frame 10. As illustrated in FIG. 2(a) of Patent Literature 1, the discharge hopper 13 may pull out the frame 10 to a front side by an action of the rails 6 and 7. In this way, cleaning work is remarkably facilitated.

In addition, Patent Literature 2 discloses a combination weighing apparatus from which a timing hopper may be removed. This Patent Literature 2 describes a specific operation of removing the timing hopper which is described with reference to FIG. 8 of Patent Literature 2. Specifically, a handle 77 is pulled downward to lift a rear guide pin 75 using a front guide pin 74 as a center of rotation, and a timing hopper 7' is slid forward and moved up to a position indicated by a two-dot chain line in FIG. 8 of Patent Literature 2 while maintaining the same angular posture. Subsequently, after the front guide pin 74 is caused to ride on an introduction portion 95b and slid forward while the handle 77 is pushed upward, the rear guide pin 75 is caused to ride on the introduction portion 95b while the handle 77 is pulled downward and slid forward. Finally, the timing hopper 7' is pulled obliquely downward to be disengaged from a guide pin guide passage 95X.

CITATION LIST

Patent Literature

Patent Literature 1: Japanese Examined Utility Model Publication No. 5-014182
Patent Literature 2: Japanese Unexamined Patent Publication No. 2010-281745

SUMMARY OF INVENTION

Technical Problem

In many cases, the combination weighing apparatus is disposed above a packaging machine for packing objects to be weighed in a substantially vertical direction. When a mounting position of the combination weighing apparatus is high, a user climbs a ladder, etc. to maintain a component related to the combination weighing apparatus. In this instance, a frame having an electric circuit, etc. therein is disposed around a timing hopper. Such a frame has a certain occupied area on a plane orthogonal to the substantially vertical direction. In addition, in order to reduce a spatial area of the apparatus itself, a space formed between the frame and a collecting chute is designed to be narrow. Therefore, the user maintains the timing hopper, etc. disposed below the frame in the substantially vertical direction while maintaining a weighing hopper disposed above the frame in the substantially vertical direction by climbing the ladder, etc. This operation is inconvenient for the user.

Even though Patent Literature 1 describes a configuration for pulling out the discharge hopper 13, Patent Literature 1 fails to consider maintenance of the timing hopper from above the base 1 in a substantially vertical direction as illustrated in FIG. 1 or FIG. 4 of Patent Literature 1. In other words, since an operation is to pull out the discharge hopper 13, the operation is performed from the same horizontal position as that of the base 1 or below the position in the substantially vertical direction.

In addition, even though Patent Literature 2 describes a configuration for facilitating removal of a timing hopper, Patent Literature 2 fails to presume removal in a case in which a collecting chute is disposed above the timing hopper.

In this regard, the present disclosure provides a combination weighing apparatus capable of facilitating (1) movement of a mounting position and (2) removal of a timing hopper.

Solution to Problem

A combination weighing apparatus in the present disclosure includes a plurality of weighing units that measures objects to be weighed, a controller that combines weights of the measured objects to be weighed and selects specific weighing units corresponding to a weight value within a desired range, a collecting chute that collects and discharges the objects to be weighed discharged from the selected weighing units, a timing hopper that temporarily retains the discharged objects to be weighed, and then discharges the objects to be weighed, a frame that directly or indirectly supports at least one of the weighing units, the controller, the collecting chute, and the timing hopper, and a support member that is a member attached to the frame and moves the timing hopper along a direction intersecting a substantially vertical direction while fixing the timing hopper at a predetermined position. The support member moves a position of the timing hopper between (1) a first mounting position at which the timing hopper receives and retains the objects to be weighed and (2) a second mounting position related to attachment and detachment of the timing hopper without changing a fixed state of the timing hopper with respect to the support member. A movement direction in which the timing hopper moves from the first mounting position to the second mounting position intersects a removing direction in which the timing hopper fixed at the predetermined position is removed from the support member.

Advantageous Effects of Invention

According to a combination weighing apparatus of the present disclosure, a timing hopper may be moved from a first mounting position to a second mounting position. In this way, a user may easily perform (1) movement of a mounting position and (2) removal of the timing hopper.

DESCRIPTION OF EMBODIMENTS

Hereinafter, an embodiment will be described in detail with reference to drawings as appropriate. However, an unnecessarily detailed description may be omitted. For example, a detailed description of well-known matters and a redundant description of substantially the same configuration may be omitted. Such descriptions may be omitted to avoid unnecessary redundancy of description below and facilitate understanding by those skilled in the art. It should be noted that the accompanying drawings and the description below are provided to enable those skilled in the art to fully understand the present disclosure, and are not intended to limit claimed subject matter.

Embodiment

Hereinafter, the present embodiment will be described with reference to FIG. 1 to FIG. 6.

[Overview]

Figure 1:
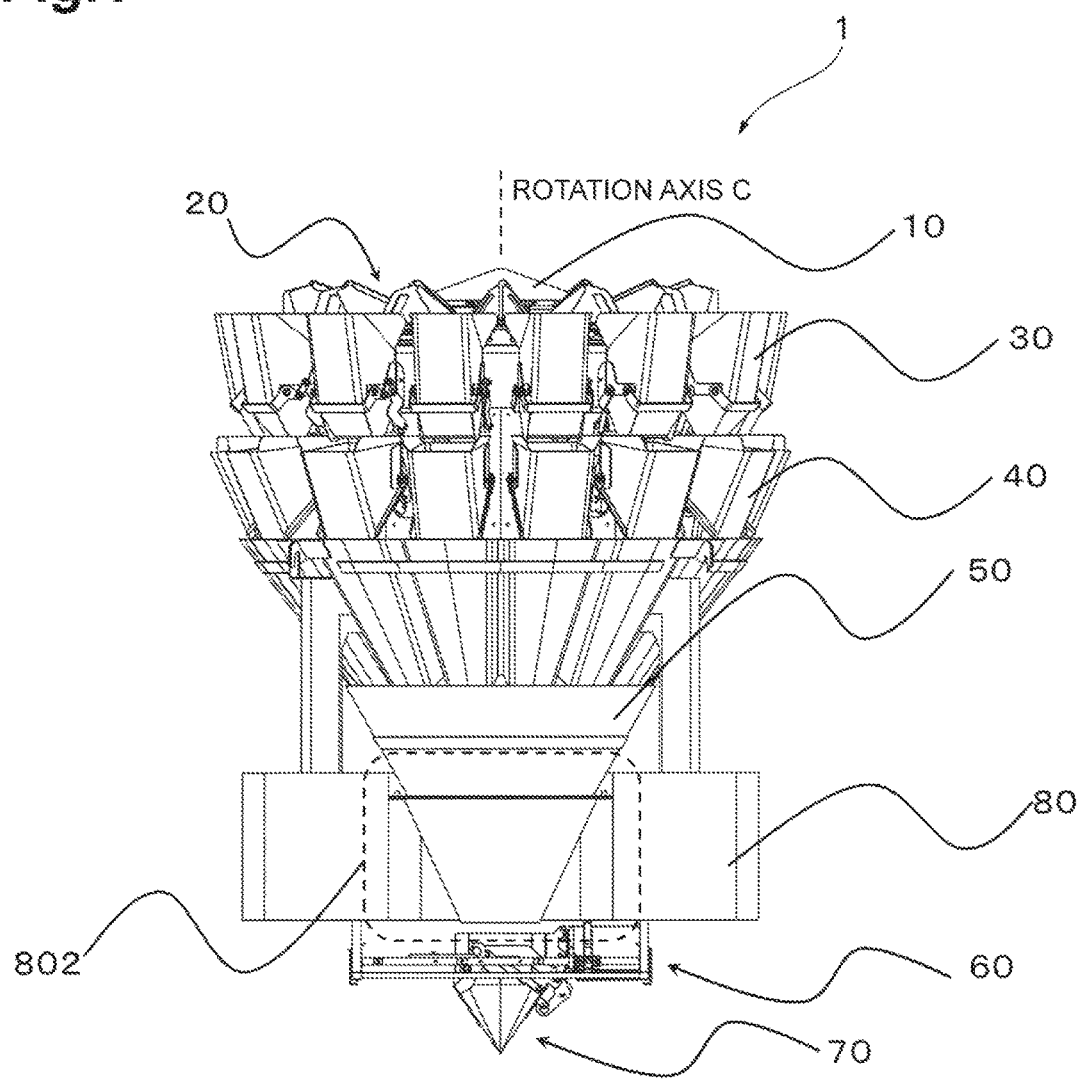
FIG. 1 is a diagram for description of an outline of a combination weighing apparatus of the present embodiment.

FIG. 1 is a diagram for description of an outline of a combination weighing apparatus 1 of the present embodiment.

The combination weighing apparatus 1 illustrated in FIG. 1 includes a distributing table 10, a conveying unit 20, a pool hopper 30, a weighing hopper (weighing unit) 40, a collecting discharge chute (collecting chute) 50, a support member 60, a timing hopper 70 and a frame 80.

Hereinafter, an operation outline of the combination weighing apparatus 1 will be first described.

First, objects to be weighed are conveyed up to the combination weighing apparatus 1 by a cross feeder (not illustrated) disposed above the combination weighing apparatus 1. Here, the objects to be weighed are soft and sticky foods such as raw chicken meats. However, the objects to be weighed are not limited thereto, and every item may be used when the item is subjected to combination weighing. The objects to be weighed conveyed by the cross feeder is supplied to a substantially central portion of the distributing table 10. The distributing table 10 is rotationally driven around a rotation axis C (see FIG. 1) extending in a vertical direction. Then, the distributing table 10 conveys the objects to be weighed, which has been supplied from above, outward in a radial direction while dispersing the objects in a circumferential direction. The objects to be weighed, which has been conveyed while being dispersed by the distributing table 10, is discharged from an outer circumferential edge of the distributing table 10.

The objects to be weighed, which has been discharged from the distributing table 10, is supplied to a plurality of conveying units 20 annularly disposed below the distributing table 10. The plurality of conveying units 20 radially extend from a center of the distributing table 10. In other words, the plurality of conveying units 20 radially extend from a center of the combination weighing apparatus 1.

Each of the conveying units 20 conveys the objects to be weighed supplied from the distributing table 10 toward each of pool hoppers 30 disposed around the distributing table 10 to correspond to each of the conveying units 20 on a one-to-one basis. Specifically, the conveying unit 20 is a member in which a screw conveying unit is disposed in a trough. The conveying unit 20 conveys the objects to be weighed by rotationally driving the screw conveying unit. Each of the conveying units 20 drops the conveyed objects to be weighed onto the pool hopper 30 disposed below an outer end portion of the conveying unit 20, thereby supplying the objects to be weighed to the pool hopper 30.

In the above description, the conveying unit 20 has been described as the screw conveying unit. However, the conveying unit 20 may correspond to a vibration feeder unit in which a trough itself vibrates to convey the objects to be weighed. In short, when the conveying unit 20 has a configuration in which the objects to be weighed supplied from the distributing table 10 can be conveyed to the pool hopper 30, any type of unit may be used.

Each of the pool hoppers 30 temporarily holds the objects to be weighed supplied from the conveying unit 20. Thereafter, each of the pool hoppers 30 supplies the held objects to be weighed to each of weighing hoppers 40 disposed below each of the pool hoppers 30 to correspond to each of the pool hoppers 30 on a one-to-one basis. In each of the weighing hoppers 40, a weight of the objects to be weighed is measured by a weighing mechanism (not illustrated).

A controller (control unit) (not illustrated) of the combination weighing apparatus 1 obtains a combination corresponding to a target weight or a combination of hoppers closest thereto by calculation among combinations of weights within an allowable range based on weights of objects to be weighed in the weighing hoppers 40. Objects to be weighed in hoppers included in the combination obtained by the controller through calculation are discharged to the collecting discharge chute 50.

The collecting discharge chute 50 is a member that collects objects to be weighed discharged from different hoppers and drops the collected objects to be weighed toward the timing hopper 70. The objects to be weighed discharged to the collecting discharge chute 50 drop onto the timing hopper 70 along the collecting discharge chute 50 by weights thereof.

The timing hopper 70 is a member for temporarily retaining the objects to be weighed supplied from the collecting discharge chute 50. The timing hopper 70 discharges the temporarily retained objects to be weighed downstream at a predetermined timing under the control of the controller (not illustrated) of the combination weighing apparatus 1.

The frame 80 is disposed around the timing hopper 70 or near an upper side of the timing hopper 70 in the substantially vertical direction. The timing hopper 70 is attached to the frame 80 through the support member 60.

The frame 80 is a member that directly or indirectly supports each member of the combination weighing apparatus 1. The frame 80 has an opening 802 in a part thereof. A user may maintain the timing hopper 70 from an upper side of the frame 80 in the substantially vertical direction since the opening 802 is provided in the frame 80. In short, the user may visually recognize the support member 60 or the timing hopper 70 even from the upper side of the frame 80 in the substantially vertical direction, and may directly work by stretching a hand.

The opening 802 may be formed by configuring the frame 80 to open to the upper side and a lower side in the substantially vertical direction and to one side (for example, a front side) in a substantially horizontal direction. Further, in that case, the opening 802 may be connected by a horned member to improve rigidity of the frame 80. Further, the opening 802 may open in an oblique direction with respect to the substantially vertical direction. In this case, referring to an opening direction of the opening 802, the opening 802 is preferably obliquely open toward the user (that is, toward the front side). In short, the frame 80 may have any configuration as long as the frame 80 has the opening 802 that opens at least upward. Hereinafter, for convenience of description, a description will be given on the assumption that the frame 80 in the combination weighing apparatus 1 according to the present embodiment is configured to open to the upper side and the lower side in the substantially vertical direction and to one side (for example, the front side) in the substantially horizontal direction.

[Specific Configuration of Mechanism Related to Mounting of Timing Hopper 70 and Support Member 60]

Figure 2:
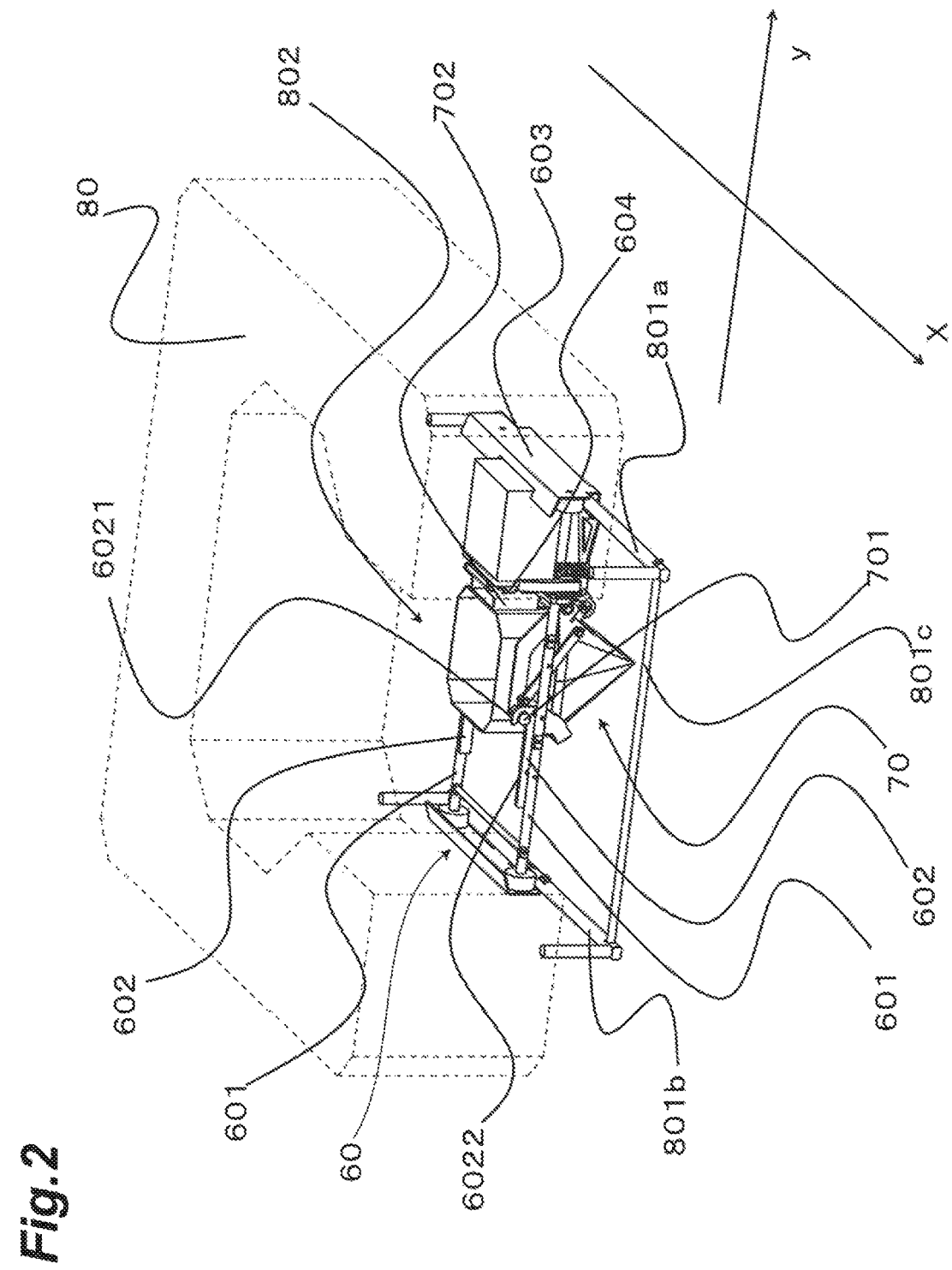
FIG. 2 is a perspective view for description of a specific configuration of a timing hopper and a support member in the combination weighing apparatus of the present embodiment.
Figure 3:
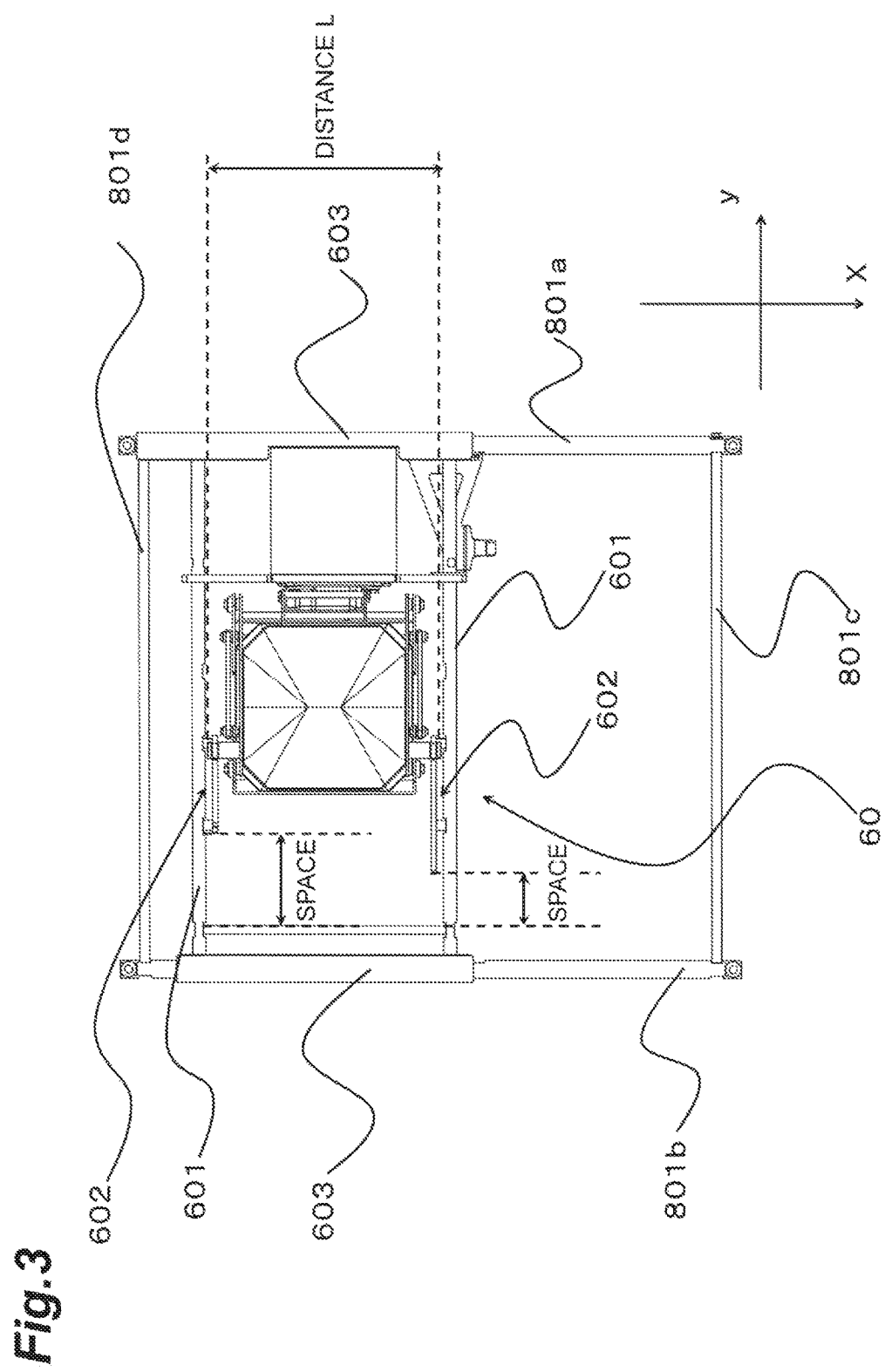
FIG. 3 is a plan view for description of a specific configuration of the timing hopper and the support member in the combination weighing apparatus of the present embodiment.
Figure 4:
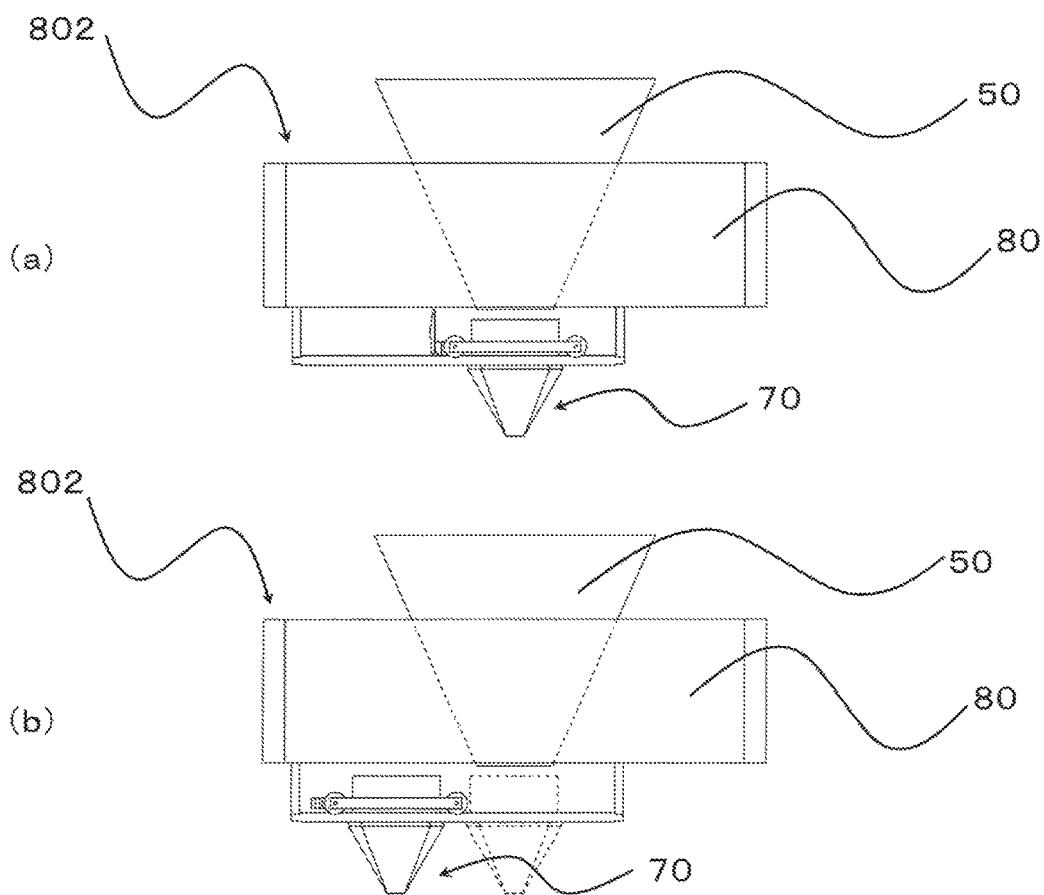
FIG. 4 is a diagram for description of a mounting position of the timing hopper in the combination weighing apparatus of the present embodiment.

Hereinafter, a description will be given of a specific configuration of a mechanism related to mounting of the timing hopper 70 and the support member 60 with reference to drawings. FIG. 2 is a perspective view for description of a specific configuration of the timing hopper 70 and the support member 60 in the combination weighing apparatus 1 of the present embodiment. FIG. 3 is a plan view for description of the specific configuration of the timing hopper 70 and the support member 60 in the combination weighing apparatus 1 of the present embodiment. FIG. 4 is a diagram for description of a mounting position of the timing hopper 70 in the combination weighing apparatus 1 of the present embodiment.

As illustrated in FIG. 2, a hanging member 801 is connected to the frame 80. The hanging member 801 is attached to a lower surface of the frame 80 on the lower side in the substantially vertical direction.

As illustrated in FIG. 2 and FIG. 3, the hanging member 801 includes a pair of members. Specifically, the hanging member 801 includes a hanging member 801*a* and a hanging member 801*b* having a longitudinal direction in an x-axis direction illustrated in FIG. 2 and FIG. 3. The hanging member 801*a* and the hanging member 801*b* face each other in an xy plane (a substantially horizontal plane) illustrated in FIG. 2.

Mounting members having a longitudinal direction in the substantially vertical direction are provided at both end portions of each of the hanging member 801*a* and the hanging member 801*b*. The hanging member 801 is connected to the frame 80 through the mounting members.

The hanging member 801 further includes a hanging member 801*c* and a hanging member 801*d* having a longitudinal direction in a y-axis direction illustrated in FIG. 2 and FIG. 3 to suppress torsion of the hanging member 801.

The support member 60 is a member that is movable on the hanging member 801 in the x-axis direction illustrated in FIG. 2 on a plane orthogonal to the substantially vertical direction (xy plane illustrated in FIG. 2 and FIG. 3). Specifically, in a state in which the timing hopper 70 is fixed to the support member 60, the support member 60 moves while sliding along the hanging member 801 between (1) a first mounting position (a state illustrated in FIG. 4(*a*)) at which the timing hopper 70 receives the objects to be weighed supplied from the collecting discharge chute 50 and (2) a second mounting position (a state illustrated in FIG. 4(*b*)) related to attachment and detachment of the timing hopper 70. When the support member 60 moves between the first mounting position and the second mounting position, the timing hopper 70 may maintain a fixed state with respect to the support member 60.

Even when the timing hopper 70 moves to the second mounting position, the timing hopper 70 does not project to an outside of the combination weighing apparatus 1. That is, even when the timing hopper 70 is moved, an installation area related to maintenance of the combination weighing apparatus 1 does not change.

The opening 802 provided in the frame 80 is located around the second mounting position. In this way, when the timing hopper 70 is located at the second mounting position, the user may easily remove the timing hopper 70 from the upper side in the substantially vertical direction through the opening 802 provided in the frame 80.

Hereinafter, a mounting mechanism of the support member 60 and the timing hopper 70 will be described with reference to drawings.

Specifically, the support member 60 includes a first rail member 601, a second rail member 602, a side plate 603, and an engagement member 604.

The timing hopper 70 includes at least an engagement pin (first engagement member) 701 and an engagement member 702.

Hereinafter, each of the above members will be described in detail with reference to drawings.

The first rail member 601 is a linear member that indirectly supports the timing hopper 70 through the second rail member 602.

Specifically, the first rail member 601 corresponds to a pair of linear members facing each other on the plane perpendicular to the substantially vertical direction (the xy plane illustrated in FIG. 2 and FIG. 3). In other words, on the above plane, longitudinal directions of the first rail members 601 are arranged on two straight lines parallel to a y-axis illustrated in FIG. 2 and FIG. 3, respectively.

Each of the first rail members 601 has rollers at both end portions. When the rollers roll along the hanging member 801, the timing hopper 70 moves between the first mounting position and the second mounting position.

The pair of first rail members 601 are spaced apart from each other such that at least the timing hopper 70 and the second rail member 602 are disposed between the first rail members 601.

The second rail member 602 is a member that is attached to the first rail member 601 to directly support the timing hopper 70. The second rail member 602 has a first end portion (second engagement member) 6021 and a sliding surface 6022.

The first end portion 6021 is a member engaged with the engagement pin 701 of the timing hopper 70 while the timing hopper 70 is fixed to the second rail member 602.

The sliding surface 6022 is a surface on which the engagement pin 701 slides. A member for guiding movement of the engagement pin 701 at the time of sliding is not attached to an upper side of the sliding surface 6022 in the substantially vertical direction. That is, in a state in which the engagement pin 701 is sliding on the sliding surface 6022, the user may remove the timing hopper 70 from an upper side in the substantially vertical direction.

A space through which the engagement pin 701 may pass is formed between the hanging member 801*b* and a second end portion opposite to the first end portion 6021 in end portions of the second rail member 602 when viewed in the substantially vertical direction (see FIG. 3). When such a configuration is adopted, after the engagement pin 701 sliding on the sliding surface 6022 arrives at the second end portion, the engagement pin 701 may be removed in this state by dropping the engagement pin 701 from the second rail member 602 to a lower side in the substantially vertical direction. In this way, the user may remove the timing hopper 70 not only from the upper side in the substantially vertical direction, but also from the lower side in the substantially vertical direction. As a result, convenience for the user may be improved.

As illustrated in FIG. 3, a pair of second rail members 602 have different longitudinal lengths. As a result, spaces formed between the second rail members 602 and the hanging member 802*b* have different sizes (see FIG. 3).

According to the above configuration, even when one of a pair of engagement pins 701 drops from the second rail member 602, the other one maintains a state of being engaged with the second rail member 602. In this way, the timing hopper 70 may be inhibited from dropping at timing not intended by the user. In short, the engagement pins 701 do not drop from the second rail members 602 at the same timing, and thus the convenience for the user may be improved.

Even though the pair of second rail members 602 have different lengths in the above description, second rail members 602 having the same length may be used in terms of manufacture.

The side plate 603 is a member connected to the end portion of the first rail member 601 to inhibit the first rail member 601 from dropping from the hanging member 801.

The engagement member 604 is a member engaged with the engagement member 702. The engagement member 604 is engaged with the engagement member 702 in a state in which the timing hopper 70 is fixed to the support member 60, in other words, in a state in which the engagement pin 701 is engaged with the first end portion 6021. In other words, in the state in which the timing hopper 70 is fixed to the support member 60, the engagement pin 701 is engaged with the first end portion 6021, and the engagement member 702 is engaged with the engagement member 604.

The engagement pin 701 is an engagement member engaged with the first end portion 6021. The engagement pin 701 slides on the sliding surface 6022 after being removed from the first end portion 6021.

A distance L (see FIG. 3) from an outermost end of one of the engagement pins 701 to an outermost end of the other one of the engagement pins 701 in a direction from the first mounting position to the second mounting position (the x-axis direction illustrated in FIG. 2 and FIG. 3) is set to be shorter than a distance between the first rail members 601. In this way, after the engagement pin 701 slides on the sliding surface 6022 and arrives at the second end portion in the second rail member 602, the user may remove the engagement pin 701 from the second rail member 602 in a substantially vertical downward direction in this state. As a result, the user may remove the timing hopper 70 in the substantially vertical downward direction.

The engagement member 702 is a member engaged with the engagement member 604. The engagement member 702 is engaged with the engagement member 604 while the timing hopper 70 is fixed to the support member 60.

[Description of Relationship Between Engagement Pin 701 Around Second Rail Member 602 and Second Rail Member 602]

Hereinafter, a description will be given of a relationship between the engagement pin 701 around second rail member 602 and the second rail member 602 with reference to drawings.

Figure 5:
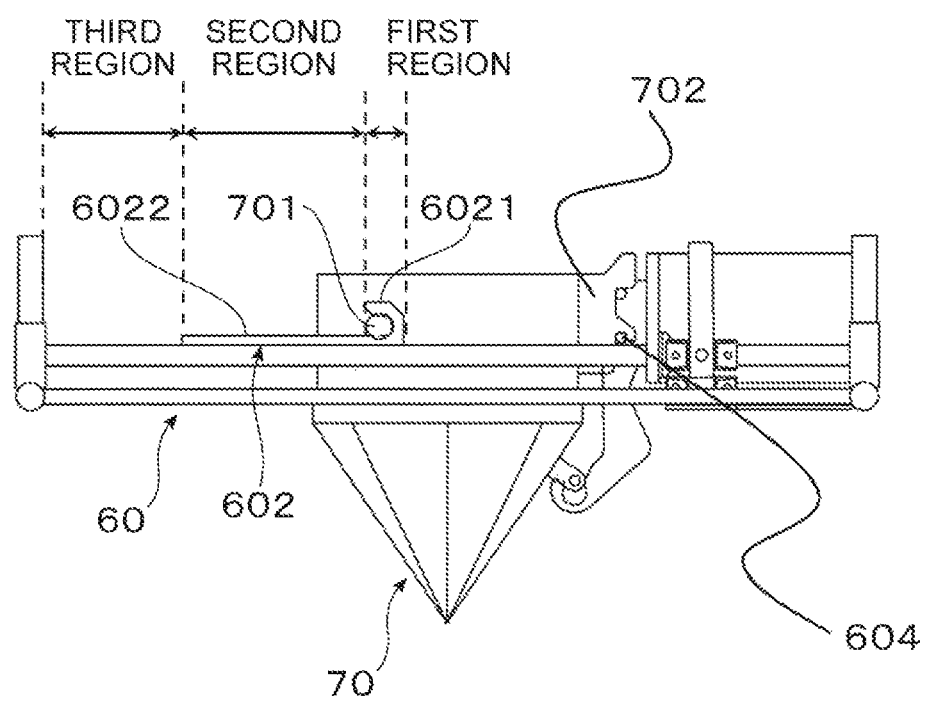
FIG. 5 is a diagram for description of a second rail member and regions imaginarily set around the second rail member in the combination weighing apparatus of the present embodiment.

FIG. 5 is a diagram for description of the second rail member 602 and regions imaginarily set around the second rail member 602 in the combination weighing apparatus 1 of the present embodiment.

As illustrated in FIG. 5, a region of the second rail member 602 and around the second rail member 602 is divided into three regions of a first region, a second region, and a third region.

The first region is a region in which the engagement pin 701 is engaged with the first end portion 6021, and the engagement member 702 is engaged with the engagement member 604 while the timing hopper 70 is fixed to the support member 60. In this first region, the timing hopper 70 is fixed to the support member 60. For this reason, the user may not remove the timing hopper 70 from either the upper side in the substantially vertical direction or the lower side in the substantially vertical direction.

The second region is a region in which the engagement pin 701 is not engaged with the first end portion 6021, and the engagement member 702 is not engaged with the engagement member 604. In short, the second region is a region in which the engagement pin 701 may freely slide on the sliding surface 6022, and only the engagement pin 701 is locked in the second rail member 602. In this second region, a member for restricting movement of the engagement pin 701 is not disposed on an upper side of the engagement pin 701 in the substantially vertical direction. That is, when the engagement pin 701 is present in the second area, the user may remove the timing hopper 70 from the upper side in the substantially vertical direction.

The third region is a region in which the engagement pin 701 does not come into contact with the second rail member 602. In more detail, when the engagement pin 701 is present in the third area, the user may remove the timing hopper 70 from either the upper side in the substantially vertical direction or the lower side in the substantially vertical direction.

The first region, the second region, and the third region are preferably formed in this order. In more detail, it is preferable to adopt a configuration in which, when the timing hopper 70 is changed from a state of being fixed to the support member 60 to a state of not being fixed to the support member 60, the user may first remove the timing hopper 70 from the upper side in the substantially vertical direction, and then remove the timing hopper 70 from any one of the upper side in the substantially vertical direction and the lower side in the substantially vertical direction. According to this configuration, the timing hopper 70 may be prevented from unexpectedly falling downward in the substantially vertical direction when the timing hopper 70 is changed from the state of being fixed to the support member 60 to the state of not being fixed to the support member 60.

A movement direction (the x-axis direction illustrated in FIG. 2 and FIG. 3) in which the timing hopper 70 moves from the first mounting position to the second mounting position is orthogonal to a removing direction (the y-axis direction illustrated in FIG. 2 and FIG. 3) in which the timing hopper 70 is removed from the support member 60. That is, the movement direction in which the timing hopper 70 moves from the first mounting position to the second mounting position is orthogonal to the removing direction in which the timing hopper 70 fixed at a predetermined position is removed from the support member 60.

For example, it is presumed that the user climbs a ladder, etc. and removes the timing hopper 70 from the upper side in the substantially vertical direction of the frame 80. Here, a movement direction of the support member 60 (the x-axis direction illustrated in FIG. 2 and FIG. 3) is set such that a far side of the user corresponds to the first mounting position, and a near side of the user corresponds to the second mounting position. Meanwhile, a movement direction of the timing hopper 70 with respect to the support member 60 (the y-axis direction illustrated in FIG. 2 and FIG. 3) is set such that movement is directed from a right side or a left side with respect to the user to the other side.

When the respective directions are set as described above, the user may grip the first rail member 601, etc. and pull out the support member 60 and the timing hopper 70 from the first mounting position to the second mounting position at the time of removing the timing hopper 70. That is, even when the user climbs the ladder, etc. and performs an operation, the user may easily move the timing hopper 70. In other words, the timing hopper 70 may be pulled out in a direction in which the user easily exerts power.

Then, after the user moves the support member 60 and the timing hopper 70 to the second mounting position, the user releases engagement of the engagement pin 701 and the first end portion 6021 and engagement of the engagement member 702 and the engagement member 604.

In this way, the user may remove the timing hopper 70 from the upper side in the substantially vertical direction. In this instance, the user may lift the timing hopper 70 with both hands close to the center of gravity of the user. That is, the user may not stretch one of a right hand or a left hand in a direction away from the center of gravity of the user at the time of removing the timing hopper 70. In other words, the user located around the opening 802 may remove the timing hopper 70 without assuming a posture by constraint. For this reason, the convenience for the user may be improved.

In addition, the second mounting position is formed at a position away from the collecting discharge chute 50. In general, the collecting discharge chute 50 has a conical shape whose tip narrows from the upper side toward the lower side in the substantially vertical direction. Therefore, a working space for the user at the second mounting position is wider than a working space for the user at the first mounting position. For this reason, the user may more easily perform an operation of removing the timing hopper 70 at the second mounting position than at the first mounting position.

The user may pull out the timing hopper 70 by griping the first rail member 601 as described above. However, in such a case, the first rail member 601 may be distorted depending on the state in which a force is applied. In this regard, a member disposed on the user side in the first rail member 601 may be configured to have a handle mechanism (grip member) that may be gripped by the user. According to such a configuration, the user may grip the handle mechanism at the time of pulling out the timing hopper 70 from the first mounting position to the second mounting position, and thus the user may more safely change a position of the timing hopper 70.

[Specific Operation Related to Removal of Timing Hopper 70]

A more detail description will be given of an operation of removing the timing hopper 70 using the respective members described above.

Figure 6:
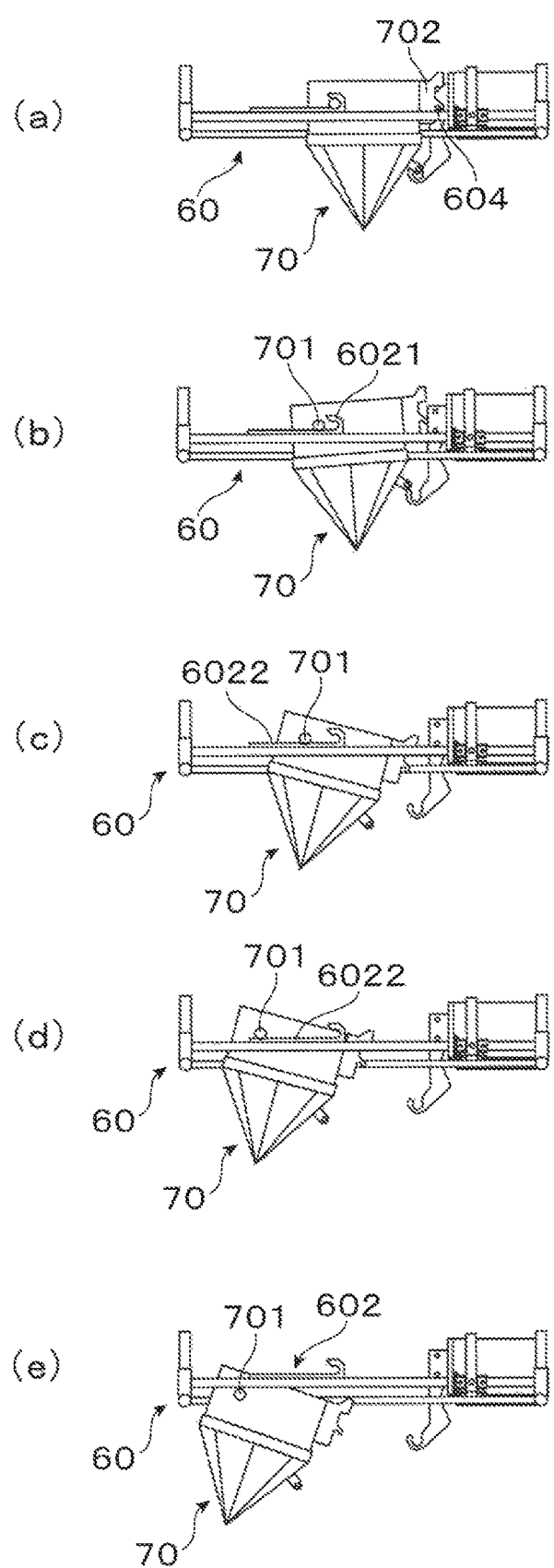
FIG. 6 is a diagram for description of an operation of removing the timing hopper from the support member in the combination weighing apparatus of the present embodiment.

FIG. 6 is a diagram for description of the operation of removing the timing hopper 70 from the support member 60 in the combination weighing apparatus 1 of the present embodiment.

[Operation of Removing Timing Hopper 70 from Lower Side of Support Member 60 in Substantially Vertical Direction]

Hereinafter, a description will be given of an operation of removing the timing hopper 70 from the lower side of the support member 60 in the substantially vertical direction.

The user may remove the timing hopper 70 from the lower side of the support member 60 in the substantially vertical direction regardless of whether the timing hopper 70 is located at either the first mounting position or the second mounting position.

When the timing hopper 70 is located at the first mounting position or the second mounting position (see FIG. 6(a)), the user releases a state in which the engagement member 702 is engaged with the engagement member 604 by stretching a hand from the lower side of the support member 60 in the substantially vertical direction to lift the timing hopper 70 upward in the substantially vertical direction.

Subsequently, the user releases a state in which the engagement pin 701 is engaged with the first end portion 6021 (see FIG. 6(b)). In other words, the user moves the engagement pin 701 to the second end portion side.

Then, the user slides the engagement pin 701 on the sliding surface 6022 to move the engagement pin 701 up to the second end portion in the second rail member 602 (see FIG. 6(c) and FIG. 6(d)).

Finally, the user may remove the timing hopper 70 from the support member 60 by dropping the engagement pin 701 substantially vertically downward from the second rail member 602 while gripping the timing hopper 70 (see FIG. 6(e)).

[Operation of Removing Timing Hopper 70 from Upper Side of Support Member 60 in Substantially Vertical Direction]

Next, a description will be given of an operation of removing the timing hopper 70 from the upper side of the support member 60 in the substantially vertical direction.

When the user removes the timing hopper 70 from the upper side in the substantially vertical direction, a space necessary for removal may not be ensured at the first mounting position due to the collecting discharge chute 50.

Therefore, first, the user moves the timing hopper 70 from the first mounting position (see FIG. 4(a)) to the second mounting position (see FIG. 4(b)).

Subsequently, the user releases the state in which the engagement member 702 is engaged with the engagement member 604 by lifting the timing hopper 70 upward in the substantially vertical direction.

Subsequently, the user releases the state in which the engagement pin 701 is engaged with the first end portion 6021 (see FIG. 6(b)). In other words, the user moves the engagement pin 701 to the second end portion side.

Then, when the engagement pin 701 is located in the second region and the third region (see FIG. 5) (see FIGS. 6(c), 6(d), and 6(e)), the user may remove the timing hopper 70 from the support member 60 by lifting the timing hopper 70 upward in the substantially vertical direction.

In this case, the user may move the position of the timing hopper 70 from the first mounting position to the second mounting position at the time of removing the timing hopper 70. Therefore, the user may not remove the collecting discharge chute 50 before removing the timing hopper 70. In this way, the user may remove the timing hopper 70 from the support member 60 from either the upper side or the lower side in the substantially vertical direction without depending on a positional relationship of the user with respect to the combination weighing apparatus 1 and without removing the collecting discharge chute 50 before removing the timing hopper 70. As a result, the convenience for the user may be improved.

SUMMARY

As described above, the combination weighing apparatus 1 in the present embodiment includes a plurality of weighing hoppers 40 that weighs the objects to be weighed, the controller that combines weights of the weighed objects to be weighed and selects specific weighing hoppers 40 corresponding to a weight value within a desired range, the collecting discharge chute 50 that collects and discharges an objects to be weighed discharged from the selected weighing hoppers 40, the timing hopper 70 that temporarily retains the discharged objects to be weighed, and then discharges the objects to be weighed, the frame 80 disposed around the timing hopper 70 to directly or indirectly support each member, and the support member 60 which is a member attached to the frame 80 and moves the timing hopper 70 along a direction intersecting the substantially vertical direction (for example, on a plane orthogonal to the substantially vertical direction (the xy plane illustrated in FIG. 2 and FIG. 3)) while fixing the timing hopper 70 at a predetermined position on the support member 60.

Further, for example, the support member 60 in the combination weighing apparatus 1 moves the position of the timing hopper 70 without changing a fixed state of the timing hopper 70 with respect to the support member 60 between (1) the first mounting position at which the timing hopper 70 receives and retains the objects to be weighed and (2) the second mounting position related to attachment and detachment of the timing hopper 70 corresponding to a mounting position of the timing hopper 70 on the above-described plane (the xy plane illustrated in FIG. 2 and FIG. 3).

Here, the movement direction in which the timing hopper 70 moves from the first mounting position to the second mounting position (for example, the x-axis direction illustrated in FIG. 2 and FIG. 3) intersects (for example, is orthogonal to) the removing direction in which the timing hopper 70 fixed at the predetermined position is removed from the support member 60 (for example, the y-axis direction illustrated in FIG. 2 and FIG. 3).

According to the above-described configuration, the user may move the timing hopper 70 by an operation of pulling out the timing hopper 70 from a far side to a near side of the user, and remove the timing hopper 70 at a position close to the user. In addition, in general, the collecting discharge chute 50 has the conical shape whose breadth narrows from the upper side toward the lower side in the substantially vertical direction. Therefore, a work area, which may not be ensured at the first mounting position, may be ensured at the second mounting position. In this way, the user may move or remove the timing hopper 70 in a posture in which power is easily exerted. Therefore, the convenience for the user may be improved. Further, since the movement direction of the timing hopper 70 intersects the removing direction of the timing hopper 70, the timing hopper 70 may be inhibited from being unintentionally removed from the support member due to the movement of the timing hopper 70.

The movement direction in which the timing hopper 70 moves from the first mounting position to the second mounting position is not restricted to a direction along a straight line. For example, the second mounting position may be a position on a lower side or a front side of the first mounting position, and the timing hopper 70 may move from the first mounting position to the second mounting position along a circular arc. When the movement direction is a direction along a curve, a tangential direction of the curve at the second mounting position may intersect the removing direction in which the timing hopper 70 is removed from the support member 60. Similarly, the removing direction in which the timing hopper 70 fixed at the predetermined position is removed from the support member 60 is not restricted to a direction along a straight line, and may be a direction along a curve. In this case, a tangential direction of the curve at the second mounting position may intersect the movement direction in which the timing hopper 70 moves from the first mounting position to the second mounting position. Further, the movement direction may be a direction along a first curve, and the removing direction may be a direction along a second curve. In this case, a tangential direction of the first curve at the second mounting position may intersect a tangential direction of the second curve at the second mounting position. In either case, the above-described effect is achieved such that the timing hopper 70 may be inhibited from being unintentionally removed from the support member due to the movement of the timing hopper 70. As a result, the convenience for the user may be improved.

In addition, the frame 80 preferably has the opening 802, which opens upward in the substantially vertical direction, around the second mounting position.

In this way, the user may stretch a hand from the opening 802 to move the timing hopper 70 from the first mounting position to the second mounting position, and then remove the timing hopper 70 upward in the substantially vertical direction. For this reason, the user may not remove another item at the time of removing the timing hopper 70, and thus convenience may be improved.

In addition, the combination weighing apparatus 1 preferably includes the handle mechanism which is used when the mounting position of the timing hopper 70 is moved. Here, the pair of first rail members 601 face each other in the movement direction in which the timing hopper 70 moves from the first mounting position to the second mounting position (the x-axis direction illustrated in FIG. 2 and FIG. 3) on the xy plane illustrated in FIG. 2 and FIG. 3. In addition, the handle mechanism is attached to the first rail member 601 disposed on a near side of the user in the movement direction of the timing hopper 70 (the x-axis direction illustrated in FIG. 2 and FIG. 3) in the pair of first rail members 601.

In this way, when the user moves the mounting position of the timing hopper 70 from the first mounting position to the second mounting position, the user may move the mounting position while gripping the handle mechanism. In this way, operability of the user may be improved.

In addition, the timing hopper 70 preferably has the engagement pin 701 engaged with the first end portion 6021. In addition, among the regions imaginarily formed around the second rail member 602, (1) the first region is a region in which the engagement pin 701 is engaged with the first end portion 6021, (2) the second region subsequent to the first region is a region in which the engagement pin 701 slides on the sliding surface 6022 and is a region in which the timing hopper 70 is removable from the upper side of the second rail member 602, and (3) the third region subsequent to the second region is a region in which the timing hopper 70 is removable from the upper side and the lower side of the second rail member 602.

Other Embodiments

As described above, the present embodiment has been described as an example of a technology in the present disclosure. However, the technology in the present disclosure is not limited thereto, and is applicable to an embodiment obtained by appropriately making modification, substitution, addition, omission, etc. in the present embodiment. In addition, a new embodiment may be obtained by combining respective components described in the above embodiment.

As described above, the present embodiment has been described as an example of the technology in the present disclosure. To this end, the accompanying drawings and the detail description have been provided.

Therefore, components described in the accompanying drawings and the detailed description may include not only an essential component for solving the problem, but also a nonessential component for solving the problem to illustrate the above technology. Therefore, a nonessential component should not be immediately recognized as an essential component even though the nonessential component is described in the accompanying drawings and the detailed description.

In addition, since the above embodiment is for illustrating the technology in the present disclosure, various modifications, substitutions, additions, omissions, etc. can be made in the scope of the claims or the equivalents thereof.

INDUSTRIAL APPLICABILITY

According to a combination weighing apparatus in the present disclosure, a timing hopper may be moved from a first mounting position to a second mounting position. In this way, a user may easily perform (1) movement of a mounting position and (2) removal of a timing hopper.

REFERENCE SIGNS LIST

1 . . . combination weighing apparatus, 10 . . . distributing table, 20 . . . conveying unit, 30 . . . pool hopper, 40 . . . weighing hopper (weighing unit), 50 . . . collecting discharge chute (collecting chute), 60 . . . support member, 601 . . . first rail member, 602 . . . second rail member, 603 . . . side plate, 604 . . . engagement member, 6021 . . . first end portion (second engagement member), 6022 . . . sliding surface, 70 . . . timing hopper, 701 . . . engagement pin (first engagement member), 702 . . . engagement member, 80 . . . frame, 801 . . . hanging member, 802 . . . opening.

The invention claimed is:

1. A combination weighing apparatus comprising:
a plurality of weighers that measures objects to be weighed;
a controller that combines weights of the measured objects to be weighed and selects specific weighers corresponding to a weight value within a desired range;
a collecting chute that collects and discharges the objects to be weighed discharged from the selected weighers a timing hopper that temporarily retains the discharged objects to be weighed, and then discharges the objects to be weighed;
a frame that directly or indirectly supports at least one of the weighers, the controller, the collecting chute, and the timing hopper; and a support that is a member attached to the frame and to which the timing hopper is fixed at a predetermined position, wherein
the support is capable of movement between (1) a first mounting position at which the timing hopper receives and retains the objects to be weighed and (2) a second mounting position related to attachment and detachment of the timing hopper, the movement of the support being relative to the frame and occurring while the timing hopper is fixed at the predetermined position,
the timing hopper is capable of movement between the predetermined position and a position that enables removal from the support, the movement of the timing hopper being relative to the support, and
a movement direction in which the support moves from the first mounting position to the second mounting position intersects a moving direction in which the timing hopper moves from the predetermined position to the position that enables removal.

2. The combination weighing apparatus according to claim 1, further comprising
a grip used when the support is moved, wherein
the support comprises a pair of supports, the pair of supports face each other in the movement direction in which the support moves from the first mounting position to the second mounting position, on a plane orthogonal to the substantially vertical direction, and
the grip is attached to a one of the supports, the one of the supports being disposed on a near side of a user in the movement direction in which the support moves.

3. The combination weighing apparatus according to claim 1, wherein the frame has an opening opened to at least an upper side around the second mounting position.

4. The combination weighing apparatus according to claim 1, wherein
the timing hopper has a pin engaged with the support,
the support has an end portion fixing the timing hopper by the pin being engaged therewith, and
among regions imaginarily formed around the support, (1) a first region is a region in which the pin is engaged with the end portion, (2) a second region subsequent to the first region is a region in which the pin slides on the support and is a region in which the timing hopper is removable from an upper side of the support, and (3) a third region subsequent to the second region is a region in which the timing hopper is removable from the upper side and a lower side of the support.

* * * * *